US011366599B2

(12) United States Patent
Yoo et al.

(10) Patent No.: US 11,366,599 B2
(45) Date of Patent: Jun. 21, 2022

(54) STORAGE DEVICE AND OPERATING METHOD THEREOF (71) Applicants: SAMSUNG ELECTRONICS CO., LTD., Suwon-si (KR); RESEARCH & BUSINESS FOUNDATION SUNGKYUNKWAN UNIVERSITY, Suwon-si (KR)

(72) Inventors: Sang Jin Yoo, Pocheon-si (KR); Dong Kun Shin, Seoul (KR); Kang Ho Roh, Seoul (KR)

(73) Assignees: SAMSUNG ELECTRONICS CO., LTD., Suwon-si (KR); RESEARCH & BUSINESS FOUNDATION SUNGKYUNKWAN UNIVERSITY, Suwon-si (KR)

( * ) Notice: Subject to any disclaimer, the term of this patent is extended or adjusted under 35 U.S.C. 154(b) by 0 days.

(21) Appl. No.: 16/913,579

(22) Filed: Jun. 26, 2020

(65) Prior Publication Data
US 2021/0141553 A1    May 13, 2021

(30) Foreign Application Priority Data
Nov. 11, 2019  (KR) .......................... 10-2019-0143439

(51) Int. Cl.
G06F 3/06        (2006.01)
G06K 9/62        (2022.01)

(52) U.S. Cl.
CPC .......... *G06F 3/0644* (2013.01); *G06F 3/0604* (2013.01); *G06F 3/0619* (2013.01); *G06F 3/0647* (2013.01); *G06F 3/0653* (2013.01); *G06F 3/0659* (2013.01); *G06F 3/0679* (2013.01); *G06K 9/6264* (2013.01)

(58) Field of Classification Search
CPC ........................... G06F 3/0644; G06F 3/0679
See application file for complete search history.

(56) References Cited

U.S. PATENT DOCUMENTS

| 8,886,911 | B2 | 11/2014 | Nemazie et al. |
| 8,966,163 | B2 | 2/2015 | Joo |
| 9,256,371 | B2 | 2/2016 | Franceschini et al. |
| 9,679,258 | B2 | 6/2017 | Mnih et al. |
| 9,697,134 | B2 | 7/2017 | Hale et al. |
| 9,804,960 | B2 | 10/2017 | Bleyer et al. |
| 10,359,933 | B2 | 7/2019 | Muchherla et al. |
| 2013/0346676 | A1* | 12/2013 | Kim ................ G06F 12/0246 711/103 |
| 2019/0065080 | A1 | 2/2019 | Tanpairoj et al. |
| 2019/0087119 | A1 | 3/2019 | Oh et al. |
| 2019/0228827 | A1 | 7/2019 | Syu et al. |
| 2019/0377681 | A1* | 12/2019 | Hodes .............. G06F 12/0871 |
| 2020/0401513 | A1* | 12/2020 | He .................. G06F 12/0246 |

\* cited by examiner

*Primary Examiner* — Edward J Dudek, Jr.
(74) *Attorney, Agent, or Firm* — F. Chau & Associates, LLC

(57) ABSTRACT

A storage device and operating method are provided. The storage device includes at least one nonvolatile memory including a single-level cell area and a multi-level cell area and a storage controller configured to dynamically resize the single-level cell area through reinforcement learning.

19 Claims, 7 Drawing Sheets

STORAGE DEVICE AND OPERATING METHOD THEREOF

CROSS-REFERENCE TO RELATED APPLICATION

This U.S. non-provisional patent application claims priority under 35 U.S.C. § 119 to Korean Patent Application No. 10-2019-0143439 filed on Nov. 11, 2019 in the Korean Intellectual Property Office, the disclosure of which is incorporated by reference in its entirety herein.

BACKGROUND

1. Technical Field

The present disclosure relates to a storage device, and more particularly, to a storage device that makes use of reinforcement learning.

2. Discussion of Related Art

Recently, portable electronic devices such as digital cameras, MP3 players, mobile phones, personal digital assistants (PDAs), and the like have been widely used. A nonvolatile memory such as flash memory is mainly used in such portable electronic devices since it has low power consumption and high integration.

A flash memory includes a plurality of memory blocks, where each memory block is divided into a single-level cell area or a multi-level cell area. When the flash memory stores write data received from a host, it stores the write data in a memory block of the single-level cell area or a memory block of the multi-level cell area depending on the characteristics of the write data.

SUMMARY

At least one exemplary embodiment of the present disclosure provides a storage device with improved performance.

At least one exemplary embodiment of the inventive concept provides a storage device capable of flexibly and dynamically adjusting a size of single-level cell area depending on the environment of a storage system.

According to an exemplary embodiment of the present disclosure, a storage device includes at least one nonvolatile memory including a single-level cell area and a multi-level cell area and a storage controller configured to dynamically resize the single-level cell area through reinforcement learning.

According to an exemplary embodiment of the present disclosure, an operating method of a storage device is provided. The method includes dividing a nonvolatile memory into a single-level cell area and a multi-level cell area based on a threshold sector count value, performing reinforcement learning on environmental information to determine a reward direction when a total amount of write data from a host for writing to the storage device reaches the threshold sector count value and dynamically adjusting the threshold sector count value according to reward direction.

According to an exemplary embodiment of the present disclosure, a storage device includes a nonvolatile memory including a single-level cell area and a multi-level cell area and a storage controller including a processing unit configured to perform reinforcement learning on environmental information of the storage device to determine an optimal ratio of the single-level cell area to the multi-level, and the storage controller dynamically adjusts a size of the single-level cell area according to the determined optimal ratio.

BRIEF DESCRIPTION OF THE DRAWINGS

The present disclosure will become more apparent by describing in detail exemplary embodiments thereof with reference to the attached drawings, in which.

DETAILED DESCRIPTION OF THE EXEMPLARY EMBODIMENTS

Hereinafter, exemplary embodiments of the present inventive concept will be described with reference to the accompanying drawings.

Figure 1:
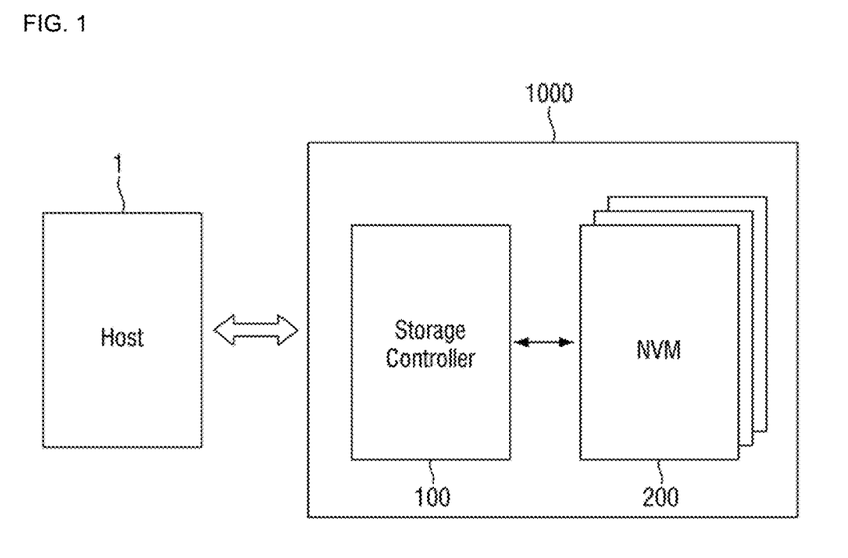
FIG. 1 is a block diagram schematically illustrating a storage system according to an exemplary embodiment of the inventive concept.
Figure 2:
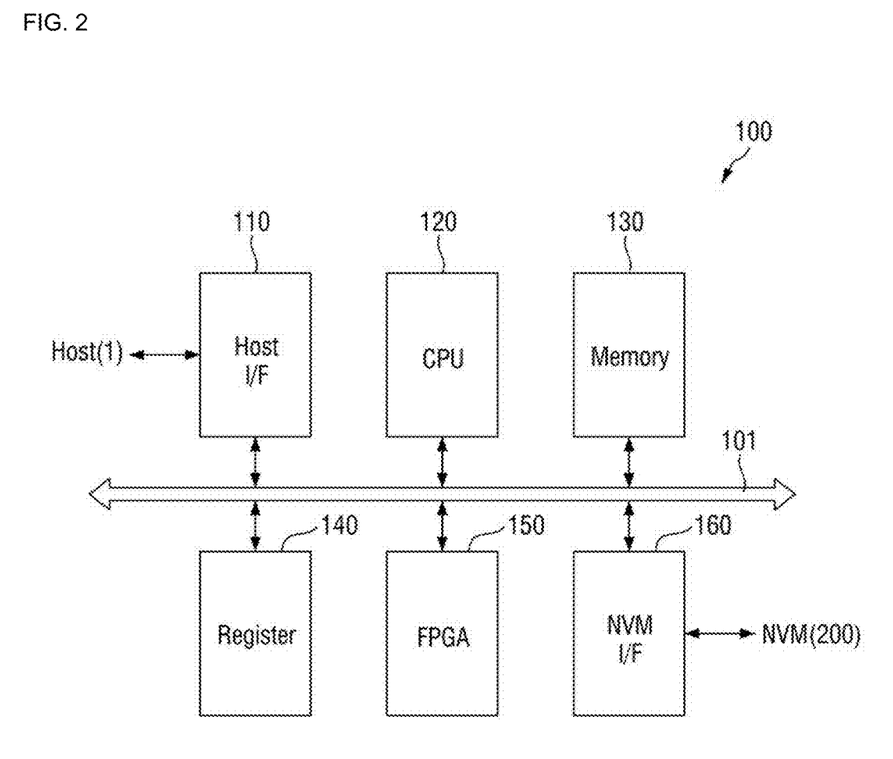
FIG. 2 is a block diagram illustrating a storage controller of FIG. 1 according to an exemplary embodiment of the inventive concept.
Figure 3:
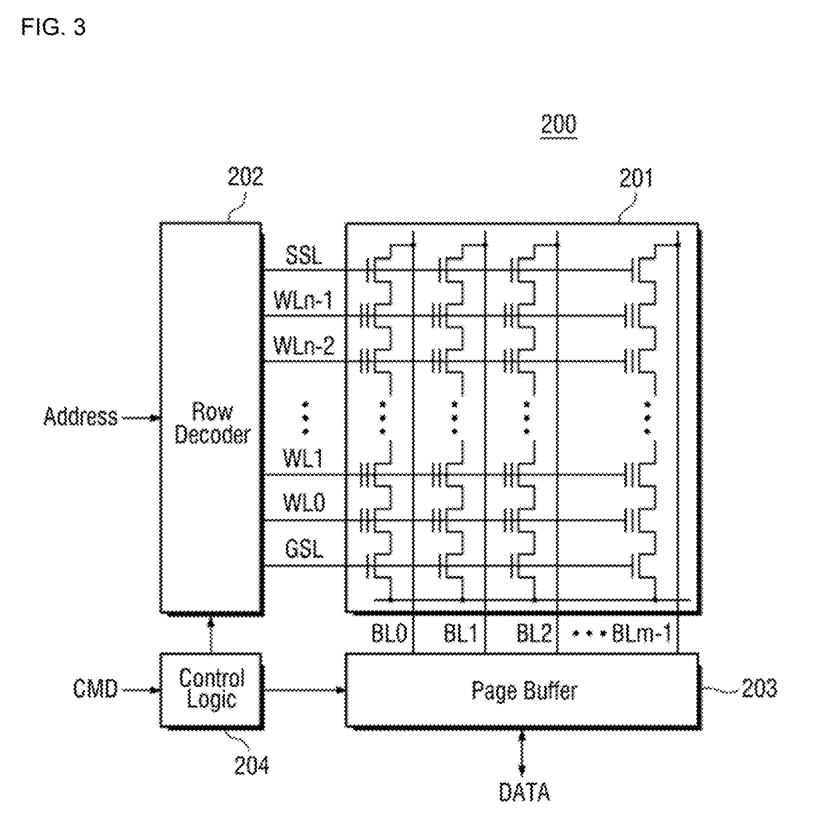
FIG. 3 is a block diagram illustrating a nonvolatile memory of FIG. 1 according to an exemplary embodiment of the inventive concept.

FIG. 1 is a block diagram schematically illustrating a storage system according to an exemplary embodiment of the inventive concept. FIG. 2 is a block diagram illustrating a storage controller of FIG. 1 according to an exemplary embodiment of the inventive concept. FIG. 3 is a block diagram illustrating a nonvolatile memory of FIG. 1 according to an exemplary embodiment of the inventive concept.

Referring to FIG. 1, a storage system includes a host 1 (e.g., a host device) and a storage device 1000. The storage device 1000 includes a storage controller 100 (e.g., a memory controller or a control circuit) and a nonvolatile memory 200 (e.g., flash memory).

When a write request occurs, the host 1 transmits write data and a logical address to the storage device 1000. The host 1 may include, according to some embodiments, a personal/portable computer, portable electronic devices such as PDAs, personal music players (PMPs) and smartphones, a television such as a high definition television (HDTV), and the like.

According to some embodiments, the storage device 1000 may be implemented as an internal memory embedded in an electronic device, for example, an embedded universal flash storage (UFS) memory device, an embedded multi-media card (eMMC), or a solid state drive (SSD). In some embodiments, the storage device 1000 may be implemented as an external memory removable from an electronic device, for example, a UFS memory card, a compact flash (CF) card, a secure digital (SD) card, a micro-SD card, a mini-SD card, an extreme digital (xD) card or a memory stick.

The storage controller 100 interfaces the host 1 with the nonvolatile memory 200. According to an exemplary embodiment, the storage controller 100 programs (e.g., writes) the write data provided from the host 1 to the nonvolatile memory 200 in response to a write command received from the host 1. Further, the storage controller 100 may control a read operation of the nonvolatile memory 200 in response to a read command received from the host 1. Furthermore, the storage controller 100 may perform one or more background operations such as wear leveling, garbage collection, and bad block management for the nonvolatile memory 200. For example, the wear leveling could ensure that less used memory blocks are preferentially used. For example, the garbage collection may move data in valid pages of several memory blocks to a single memory block and then later perform an erase on operation on the several memory blocks to free up space. For example, the bad block management may keep track of bad blocks so that data is written to blocks other than the bad blocks or moved from the bad blocks to the other blocks.

As shown in FIG. 2, the storage controller 100, according to an exemplary embodiment of the inventive concept, includes a host interface 110 (e.g., an interface circuit), a processing unit 120 (e.g., a processor such as central processing unit), a memory 130, a register 140, a programmable logic 150 (e.g., a field programmable gate array), and a nonvolatile memory interface 160 (e.g., an interface circuit).

The components in the storage controller 100 are connected to each other via a data bus 101. The data bus 101 may include a plurality of channels. In an exemplary embodiment, the plurality of channels may indicate communication paths driven independently of each other, and the plurality of channels may communicate with devices connected thereto based on the same communication method.

The host interface 110 is connected to the host 1. In an exemplary embodiment, the host interface 110 may be based on at least one of various interfaces such as a double data rate (DDR) interface, a low-power DDR (LPDDR) interface, a universal serial bus (USB) interface, a multimedia card (MMC) interface, a peripheral component interconnection (PCI) interface, a PCI-express (PCI-E) interface, an advanced technology attachment (ATA) interface, a serial ATA (SATA) interface, a parallel ATA (PATA) interface, a small computer system interface (SCSI), an enhanced small disk interface (ESDI), an integrated drive electronics (IDE) interface, a mobile industry processor interface (MIPI), a nonvolatile memory-express (NVM-e) interface, and a universal flash storage (UFS) interface.

The processing unit 120 may control the operation of each component in the storage controller 100 and perform arithmetic operations with respect to a write command, a read command, a delete command, or other commands received from the host 1 that are related to the operation of the storage device 1000.

According to an exemplary embodiment of the inventive concept, the processing unit 120 performs a learning operation to learn about a control operation of the nonvolatile memory 200. In an exemplary embodiment, the processing unit 120 performs a reinforcement learning operation related to migration between a single-level cell area and a multi-level cell area.

The memory 130 may store data necessary for the operation of the storage controller 100. According to some embodiments, the memory 130 may include a cache, a read only memory (ROM), a programmable read only memory (PROM), an erasable prom (EPROM), an electrically erasable programmable read-only memory (EPEPROM), a phase-change RAM (PRAM), a flash memory, a static RAM (SRAM), or a dynamic RAM (DRAM).

According to some embodiments, the memory 130 may store various information related to the reinforcement learning, including environmental information or a threshold sector count value. According to an exemplary embodiment of the inventive concept, the memory 130 is a nonvolatile memory to store information such as a queue table.

The register 140 may be an operation memory for storing write data received from the host 1, read data received from the nonvolatile memory 200, and operation results generated during a control operation in the processing unit 120. The register 140 may also be referred to as a buffer memory.

The programmable logic 150 may perform some of the operations performed by the processing unit 120. For example, the processing unit 120 may offload some of the operation it would normally perform to the programmable logic 150. For example, the processing unit 120 may offload a part of an operation it would normally perform to the programmable logic 150. According to an exemplary embodiment, the programmable logic 150 is a programmable logic device (PLD) that is used to design digital circuits that perform a particular operation. For example, the PLD may include a plurality of programmable gate arrays.

The nonvolatile memory interface 160 may also be referred to as a nonvolatile memory controller and accesses the nonvolatile memory 200 to control an operation of each of a plurality of nonvolatile memories. In an exemplary embodiment, the nonvolatile memory interface 160 is connected to the nonvolatile memory 200 through at least one channel to write, read, or delete data.

The nonvolatile memory 200 is provided as a storage medium of the storage device 1000. For example, the nonvolatile memory 200 may be configured as a NAND-type flash memory having a large storage capacity.

In this case, the nonvolatile memory 200 may include memory areas managed in different ways. Each memory area is composed of a plurality of memory blocks. The nonvolatile memory 200 may be configured as a NOR flash memory or a next generation nonvolatile memory such as phase-change random access memory (PRAM), magnetic random access memory (MRAM), resistive random access memory (ReRAM), ferroelectric random access memory (FRAM) and the like. Alternatively, the nonvolatile memory 200 may be replaced with a memory that is entirely configured as dynamic random access memory (DRAM) or static random access memory (SRAM), which is a volatile memory. Alternatively, the nonvolatile memory 200 may be replaced with a memory including a nonvolatile portion (e.g., flash) and a volatile portion (e.g., DRAM).

As shown in FIG. 3, the nonvolatile memory 200 according to an exemplary embodiment of the inventive concept includes a cell array 201 (e.g., a memory cell array) a row decoder 202 (e.g., a decoder circuit), a page buffer 203, and a control logic 204 (e.g., a controller or control circuit).

The cell array 201 may include a plurality of memory blocks. FIG. 3 illustrates the cell array 201 including one memory block for simplicity of description. Each of the memory blocks may be composed of a plurality of pages. Each page may be composed of a plurality of memory cells. In the nonvolatile memory 200, an erase operation may be performed on a memory block basis, and a write or read operation may be performed on a page basis.

The cell array 201 may include a plurality of memory cells. In an exemplary embodiment, the memory cells have a cell string structure. One cell string includes a string selection transistor SST connected to a string selection line SSL, a plurality of memory cells connected to a plurality of word lines WL0 to WLn−1, and a ground selection transistor GST connected to a ground selection line GSL. The string select transistor SST is connected to a bit line BL (e.g., one of bits lines BL0, BL1, BL2, BLm−1), and the ground selection transistor GST is connected to a common source line CSL.

The cell array 201 may include a substrate and a plurality of cell strings formed vertically on the substrate. Each of the plurality of cell strings may include a plurality of cell transistors stacked in a direction perpendicular to the substrate. In other words, the cell array 201 may be formed in a three-dimensional structure (or a vertical structure).

The row decoder 202 is connected to the cell array 201 through the selection lines SSL and GSL or the word lines WL0 to WLn−1. In a program (e.g., a write) operation or a read operation, the row decoder 202 receives an address and selects one word line (e.g., WL1). Further, the row decoder 202 transfers a voltage required for the program or read operation to the selected word line or an unselected word line.

The page buffer 203 operates as a write driver or as a sense amplifier. The page buffer 203 may temporarily store data to be programmed in selected memory cells or data read from the selected memory cells. The page buffer 203 is connected to the cell array 201 through bit lines BL0 to BLm−1. In the program operation, the page buffer 203 receives data and delivers the data to the memory cells of a selected page. In the read operation, the page buffer 203 reads data from the memory cells of the selected page and outputs the data to the outside.

The control logic 204 may control operations such as program, read and erase operations of the nonvolatile memory 200. For example, during a program operation, the control logic 204 may control the row decoder 202 to provide a program voltage to a selected word line. The control logic 204 may control the page buffer 203 to provide program data to a selected page.

Figure 4:
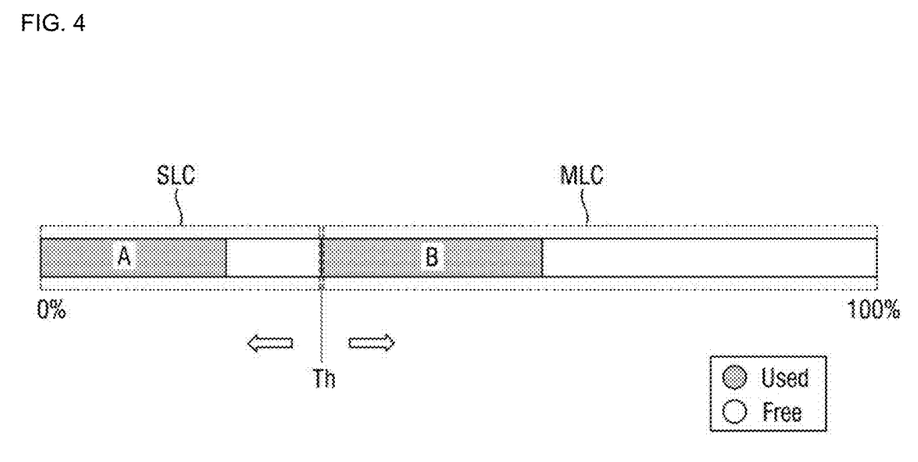
FIG. 4 is a diagram illustrating a configuration of the nonvolatile memory according to an exemplary embodiment of the inventive concept.

FIG. 4 is a diagram illustrating a configuration of the nonvolatile memory according to an exemplary embodiment of the inventive concept.

In an exemplary embodiment, the nonvolatile memory 200 is divided into a first memory area and a second memory area based on a threshold value Th. Each memory area may include a plurality of memory blocks. The first memory area and the second memory area may be managed in different ways. According to an exemplary embodiment, the first memory area is managed in a single-level cell (SLC) mode, and the second memory area is managed in a multi-level cell (MLC) mode. In an exemplary embodiment, some of the write data is programmed in the first memory area (i.e., the single-level cell area) and the remaining write data other than the metadata is programmed in the second memory area (i.e., the multi-level cell area). For example, the metadata may be stored in the first memory area. For example, the metadata could include mapping information that maps a logical address from the host 1 to a physical address of the memory device 200. For example, the metadata could include information used for wear leveling some as program/erase counts.

The speed at which the program and read operations are performed is faster in the single-level cell (SLC) area than in the multi-level cell (MLC) area. In an exemplary embodiment, data that is frequently changed according to a pattern of the host 1 is stored in the SLC area, and data that is not frequently changed is stored in the MLC area. In an exemplary embodiment, data that is changed at a certain rate or higher is stored in the SLC area and data that is changed below that certain rate is stored in the MLC area.

The storage controller 100 uses the single-level cell area to compensate for the slow performance of the multi-level cell area. The size of the single-level cell area may be statically or dynamically adjusted depending on an application method.

For example, if the size (0~Th) of the single-level cell area is large, the size (100-Th) of the multi-level cell area is reduced by that amount, thereby reducing the space utilization of the nonvolatile memory and reducing the overall data storage capacity. In this case, the space utilization may be a ratio of a used area (B) to the entire area (100-Th) of the multi-level cell area.

On the other hand, if the size (0~Th) of the single-level cell area is small, in order to secure an available space (Th-A) in the single-level cell area, migration may frequently occur in which some of the data (A) stored in the single-level cell area is transferred to the multi-level cell area. As a result, the performance of the storage device may degrade. Therefore, the size of the single-level cell area, i.e., the threshold value Th, should be appropriately selected.

At least one exemplary embodiment of the present disclosure provides a storage device whose performance is improved by flexibly and dynamically adjusting a size of a single-level cell area depending on the environment of the storage system.

The processing unit 120 of FIG. 2, according to an exemplary embodiment of the inventive concept, determines the threshold value Th, which is a boundary between the SLC area and the MLC area, on a basis of sector count. That is, the size of the SLC area is determined by a threshold sector count value, and the size of the MLC area is determined as the remaining region (100-Th (%)) obtained by subtracting the SLC area from the entire area (100%) of the nonvolatile memory 200. For example, of the memory device 200 is capable of storing a megabyte of data, and the SLC area is resized to store a tenth of the megabyte based on the threshold sector count value, then the MLC area would be resized to store nine tenths of the megabyte.

The processing unit 120 may dynamically change the size of the SLC area (i.e., the threshold sector count value) by performing a reinforcement learning operation based on the environmental information of the host 1 and/or the storage device 1000.

The reinforcement learning may be described in terms of agent, action, environment, state, and reward. The reinforcement learning operation is a learning method in which an agent defined in a certain environment recognizes a current state and selects an action or order of actions that maximizes the reward among the selectable actions.

During a reinforcement learning operation according to an exemplary embodiment, the processing unit 120 (i.e., the agent) performs an action on a threshold sector count value determined in a current cycle, collects a variation in environmental information following the action, and checks the state of the storage device 1000 based on the collected information to determine the reward. The processing unit 120 may readjust the threshold sector count value according to the checked state and the determined reward.

According to an exemplary embodiment, the action is an operation of increasing or decreasing the size of the single-level cell area or the threshold sector count value. For example, increasing the threshold sector count value by a certain amount could result in a reward such as a ten percent increase in access speed of the memory device 200. For example, decreasing the threshold sector count value by a certain amount could result in a reward such as a thirty percent increase in storage capacity of the memory device 200.

In an exemplary embodiment, the environmental information includes environmental information on the host 1, on the nonvolatile memory 200, and on a previous epoch.

The storage controller 100 may include a queue table. A detailed description of the state and queue table will be given with reference to FIG. 9.

According to an exemplary embodiment, the queue table is stored in the memory 130. Alternatively, although not shown, the queue table may be stored in an external memory connected to the processing unit 120, according to some embodiments. Alternatively, the queue table may be stored in the nonvolatile memory 200 according to some embodiments.

In an exemplary embodiment, the processing unit 120 determines the reward. The reward may be determined by taking into account a migration cost and a current state of the nonvolatile memory. As a reward function, if the migration cost of the current cycle is greater than an average migration cost, it may be determined whether to calculate the reward positively or negatively in consideration of the variation in a valid/invalid page count ratio of the SLC area between the current cycle and the previous cycle. For example, migrating (or moving) a large amount of data from the SLC area to the MLC area as a result of making the SLC area much smaller may generate a large migration cost and migrating a small amount of data from the SLC area to the MLC area as a result of making the SLC area slightly smaller may generate a small migration cost.

If the valid/invalid page count ratio of the current cycle is smaller than the valid/invalid page count ratio of the previous cycle, the processing unit 120 may calculate a negative reward for the action of the current cycle. Otherwise, if the valid/invalid page count ratio of the current cycle is larger than the valid/invalid page count ratio of the previous cycle, the processing unit 120 may calculate a positive reward for the action of the current cycle. Accordingly, by considering not only the migration cost but also the valid/invalid page count ratio, it is possible to prevent the single-level cell area from increasing in size inefficiently.

Figure 5:
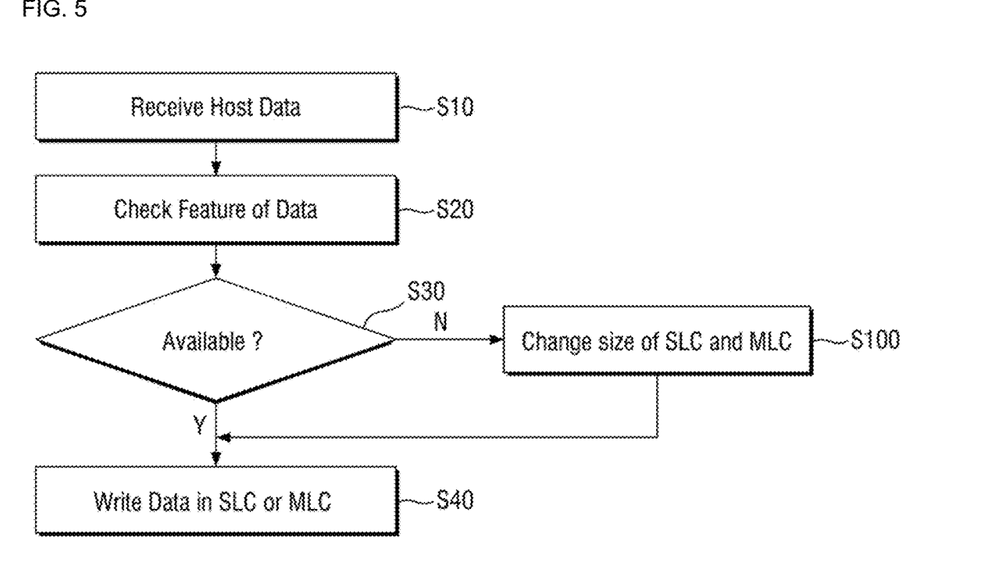
FIGS. 5 and 6 show flowcharts explaining an operating method of the storage device, according to an exemplary embodiment of the inventive concept.
Figure 6:
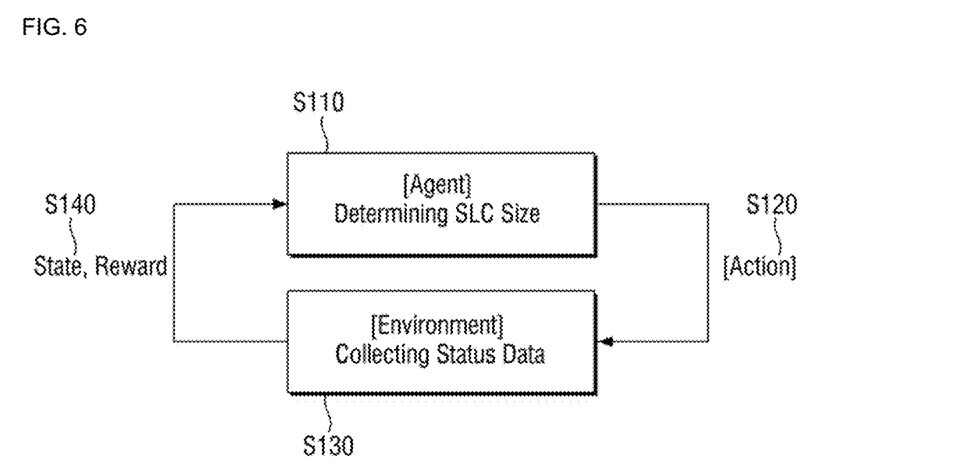
Figure 7:
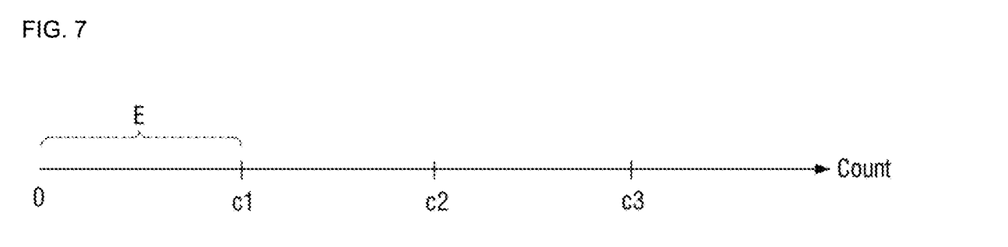
FIG. 7 is a diagram explaining a cycle of the reinforcement learning according to an exemplary embodiment of the inventive concept.
Figure 8:
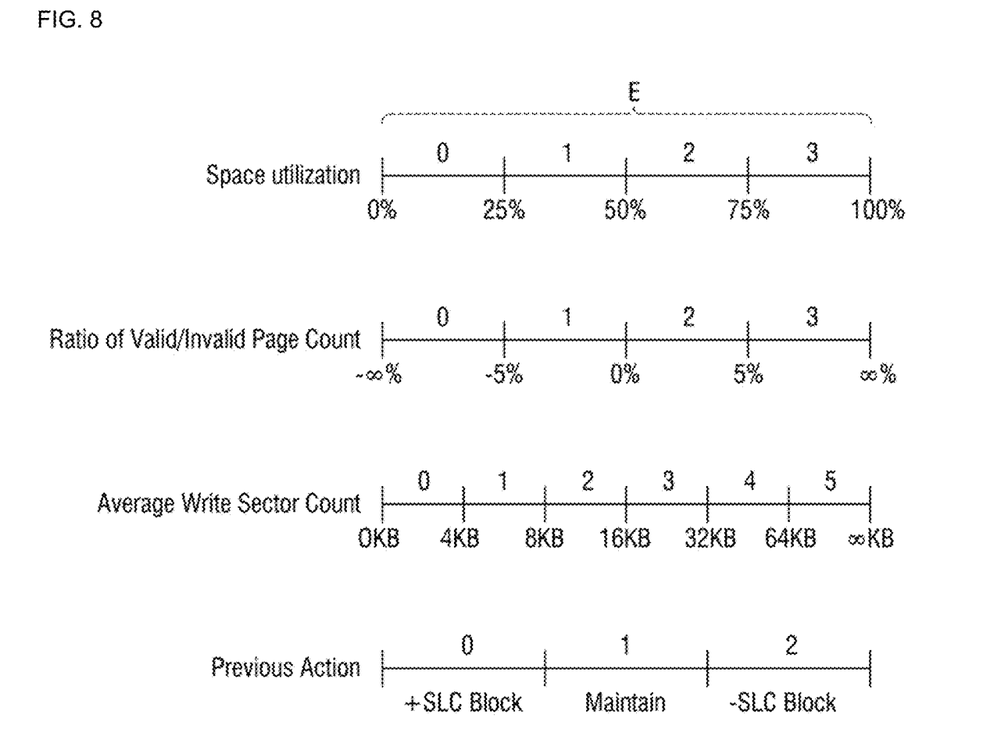
FIG. 8 is a diagram explaining environmental information of the reinforcement learning according to an exemplary embodiment of the inventive concept.
Figure 9:
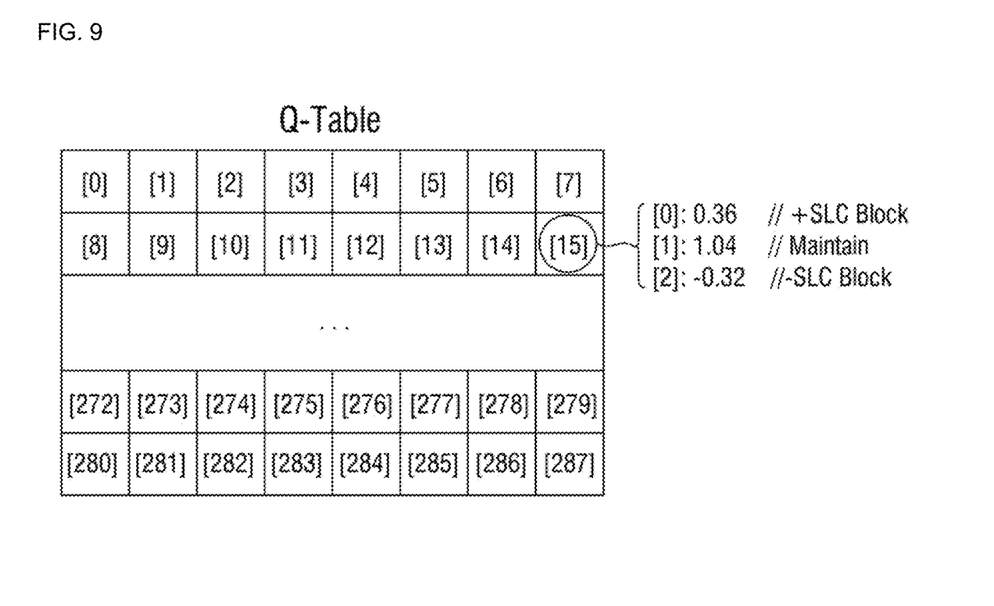
FIG. 9 is a diagram explaining a queue table according to an exemplary embodiment of the inventive concept.

FIGS. 5 and 6 show flowcharts explaining an operating method of the storage device, according to exemplary embodiments of the inventive concept. FIG. 7 is a diagram explaining a cycle of the reinforcement learning according to an exemplary embodiments FIG. 8 is a diagram explaining environmental information of the reinforcement learning according to some exemplary embodiments. FIG. 9 is a diagram explaining a queue table according to some exemplary embodiments.

Referring to FIG. 5, when the storage device receives write data from the host (step S10), the storage device checks a characteristic (e.g., a feature) of the data (step S20).

If the data is data to be written in the single-level cell area, it is checked whether or not the data can be written in the single-level cell area (step S30). If the data can be written in the single-level cell area (i.e., if the write data is smaller than the empty space of the single-level cell area), the storage device programs (or writes) the write data into the single-level cell area.

If the data is data to be written in the multi-level cell area, the storage device verifies whether or not the data can be written in the multi-level cell area (step S30), and programs (or writes) the write data into the multi-level cell area.

However, if the total amount of the write data received from the host is larger than the size of the single-level cell area, that is, if there is not enough empty space to program the write data in the single-level cell area, the boundary between the single-level cell area and the multi-level cell area is adjusted by a threshold value predicted by the reinforcement learning (step S100).

The storage device (e.g., the agent) performs an action on the nonvolatile memory (S110, Agent) divided by the threshold value set in the current cycle, i.e., by the threshold sector count value (step S120).

The action may be an operation of increasing or decreasing the size of the single-level cell area. According to an exemplary embodiment, the action may be an operation of increasing or decreasing the threshold sector count value.

The storage device collects environmental information (e.g., status data) on the storage device on which the action has been performed (step S130). The environmental information may be collected during one unit cycle. In other words, the reinforcement learning is carried out every unit cycle.

As shown in FIG. 7, the unit cycle is determined based on a write count value of data, not the time. More specifically, the reinforcement learning is performed whenever the total amount of write data received from the host 1 is greater than or equal to the size of single-level cell area, that is, every time the write data can no longer be programmed into the single-level cell area. Therefore, a section 0-c1 and a section c1-c2 may be different in the time domain, but may be the same in the count value domain. Here, in this specification, a section from a time point when the whole space of the single-level cell area is free (i.e., the free space in the SLC is 100%) to a time point when the total amount of write data received from the host 1 becomes equal to the size of the single-level cell area (i.e., the free space in the SLC is 0%) is referred to as one unit cycle or epoch. For example, if the free space of the SLC is 100% at time 0 and the free space is 0% after 1 second has elapsed from time 0, then the epoch is 1 second.

The environmental information includes environmental information on the host, environmental information on the nonvolatile memory, and environmental information on a previous epoch. In an exemplary embodiment, the environmental information includes environmental information on the host and environmental information on a previous epoch (i.e., excludes the environmental information on the nonvolatile memory). In an exemplary embodiment, the environmental information includes environmental information on the nonvolatile memory and environmental information on a previous epoch (i.e., excludes the environmental information on the host). The environmental information on the host may be an index for identifying the pattern of the host (e.g., an average write sector count value).

The environmental information on the nonvolatile memory 200 may include, for example, space utilization information, valid page count information, invalid page count information, and valid/invalid page count ratio information.

The space utilization information is information about the sizes of free space and used space (space in which data has been written), a ratio of the spaces, and the like in the current cycle. Although, in the illustrated embodiment of FIG. 8, the space is divided into four sections (each 25%), it may be divided into fewer sections or more sections according to some embodiments. Since the write operation of the storage controller 100 is performed on a physical page basis, information on valid page count, invalid page count, or valid/invalid page count ratio of the nonvolatile memory 200 may also be used as the environmental information. In the illustrated embodiment of FIG. 8, the valid/invalid page count ratio information is divided into four sections, but according to some embodiments, it may be divided into fewer sections or more sections. In addition, although the average write sector count is divided into six sections in the illustrated embodiment of FIG. 8, it may also be divided into fewer sections or more sections according to some embodiments. A previous action serving as historical information of the previous cycle may be divided into 3 sections when comparing the previous cycle to a cycle preceding the previous cycle: a section in which the state has been maintained (Maintain); a section in which a size of the single-level cell area has been reduced (−SLC block); and a section in which a size of the single-level cell area has been increased (+SLC block).

The environmental information on the previous cycle may include historical information on the reinforcement learning of the previous cycle, that is, may include information on the agent, action, environment on the storage device, state and reward in the previous cycle.

The storage device checks the state in a queue table based on the environmental information (step S140). As shown in FIG. 9, the queue table may include a plurality of states defined in the reinforcement learning.

The number of states stored in the queue table may be determined depending on factors collected as the environmental information and the number of states defined in each factor. As a more specific example, in FIG. 8, a case in which the storage device has four factors as the environmental information will be described. Herein, it will be assumed that the storage device has collected the previous action serving as historical information of the previous cycle, the space utilization of the single-level cell area in the current cycle, the ratio of valid/invalid page count of the single-level cell area, and the average write sector count of the host.

The storage device may distinguish a plurality of states for each factor. Referring to the queue table of FIG. 9 according to the embodiment of FIG. 8, the number of states stored in the queue table is 288 (=4×4×6×3). Specifically, in the illustrated example, the space utilization of the single-level cell area is divided into 4 states, the ratio of valid/invalid page count of the single-level cell area is divided into 4 states, the average write sector count of the host is divided into 6 states, and the previous action serving as the history information of the previous cycle is divided into 3 states. Therefore, the total number of cases of the states to which the storage device can belong is 288.

The queue table (e.g., Q-Table) may store the direction of rewards corresponding to respective states. The reward function may be determined by a Q-learning equation. The Q-learning equation is one of the reinforcement learning techniques for learning without a model. In an exemplary embodiment, reward function is a function that predicts an expected value of utility for performing a given action in a given state. In the Q-learning equation, the result value of the equation is determined based on the valid/invalid page count ratio and the data migration cost between the single-level cell area and the multi-level cell area, and thus a reward direction may be determined.

In the example shown in FIG. 9, if the result value of the equation is 1.04, the action taken by the agent in the current cycle is appropriate, and thus the reinforcement learning is performed by maintaining the current state. If the result value of the equation is −0.32, it is determined that the action taken on the agent in the current cycle has been negatively rewarded. Therefore, the size of the single-level cell area is reduced, and the action is performed in the direction of decreasing the threshold sector count in the next cycle.

In an exemplary embodiment, each box of the Q-Table of FIG. 9 is an entry. Thus, the Q-Table may include a plurality of entries. Each entry may indicate a distinct one of a plurality of environmental states and a reward history. For example, a first one of the states could be a space utilization between 0 and 25%, a ratio of valid/invalid page count of 0 to 5%, an average write sector count of 16 KB to 32 KB, and that the size of the SLC area was previously maintained; and a second one of the states could be space utilization between 25 and 50%, a ratio of valid/invalid page count of 0 to 5%, an average write sector count of 32 KB to 64 KB, and that the size of the SLC area was previously increased. In an exemplary embodiment, the storage controller 100 performs a reinforcement learning that determines a selected state among the plurality of states using the environmental information, calculates a current reward from the selected state and the environmental information, determines a reward direction based on the current reward and the reward history of the entry indicating the selected state, and adjusts the threshold sector count value according to the calculated reward direction.

According to an exemplary embodiment, when the migration cost of the previous cycle is greater than or equal to the average migration cost, and the valid/invalid page count ratio in the current cycle of the single-level cell area is smaller than the valid/invalid page count ratio in the previous cycle thereof, the reward is determined as a negative reward for adjusting the size of the single-level cell area. That is, the weight for the reward direction is reduced. On the other hand, when the migration cost of the previous cycle is greater than or equal to the average migration cost, and the valid/invalid page count ratio in the current cycle of the single-level cell area is greater than the valid/invalid page count ratio in the previous cycle thereof, the reward is determined as a positive reward that increases the weight for the reward direction.

Further, according to an exemplary embodiment, when the migration cost of the previous cycle is smaller than the average migration cost, the reward is determined as a negative reward for resizing the single-level cell area.

Furthermore, when the migration cost of the previous cycle is smaller than the average migration cost, and the valid/invalid page count ratio in the current cycle of the multi-level cell area is smaller than the valid/invalid page count ratio in the previous cycle thereof, the negative reward for resizing the single-level cell area is increased.

Figure 10:
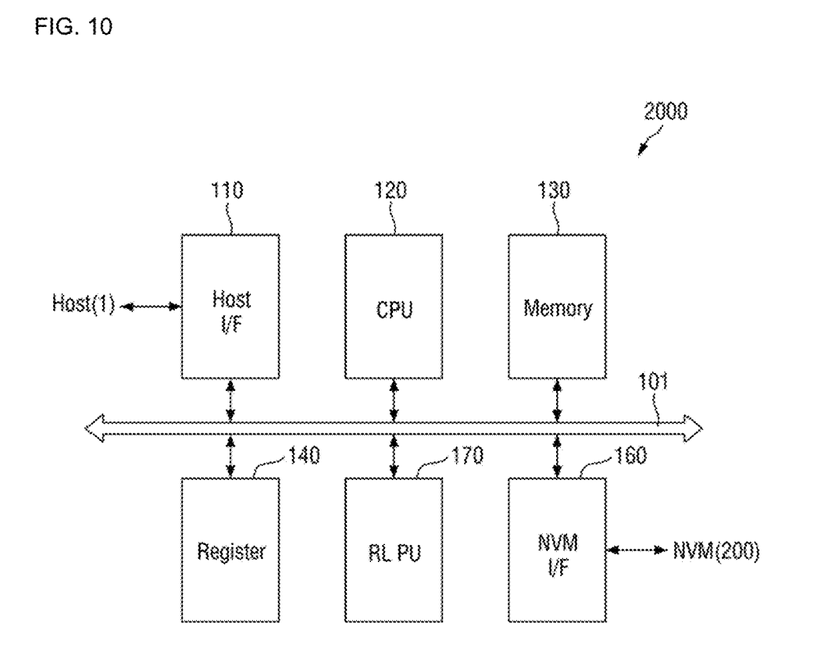
FIG. 10 is a block diagram showing the storage controller according to an exemplary embodiment of the inventive concept.

FIG. 10 is a block diagram showing a storage controller 2000 according to an exemplary embodiment of the inventive concept. For simplicity of description, differences from FIG. 2 will be mainly described. The storage controller 2000 may be used to implement the storage controller 100 of FIG. 1.

According to an exemplary embodiments, reinforcement learning of the storage device is performed in a separate learning processing unit 170 unlike FIG. 2. The processing unit 120 performs general control operations of the storage controller 100, and the learning processing unit 170 performs the reinforcement learning on the size of the single-level cell area based on the environmental information of the storage device.

The learning processing unit 170 may perform the reinforcement learning as described with reference to FIG. 6 whenever the single-level cell area is completely used by the write data of the host. For example, the learning processing unit 170 may perform the reinforcement learning whenever it is predicted that the write data will completely fill the single-level cell area.

In an exemplary embodiment, the processing unit 170 is configured to perform the reinforcement learning on the environmental information to determine an optimal ratio of the single-level cell area to the multi-level area, and the storage controller 100 dynamically adjusts a size of the single-level cell area according to the determined optimal ratio.

The queue table may be stored in a memory 130 or in the nonvolatile memory 200 according to some embodiments.

Figure 11:
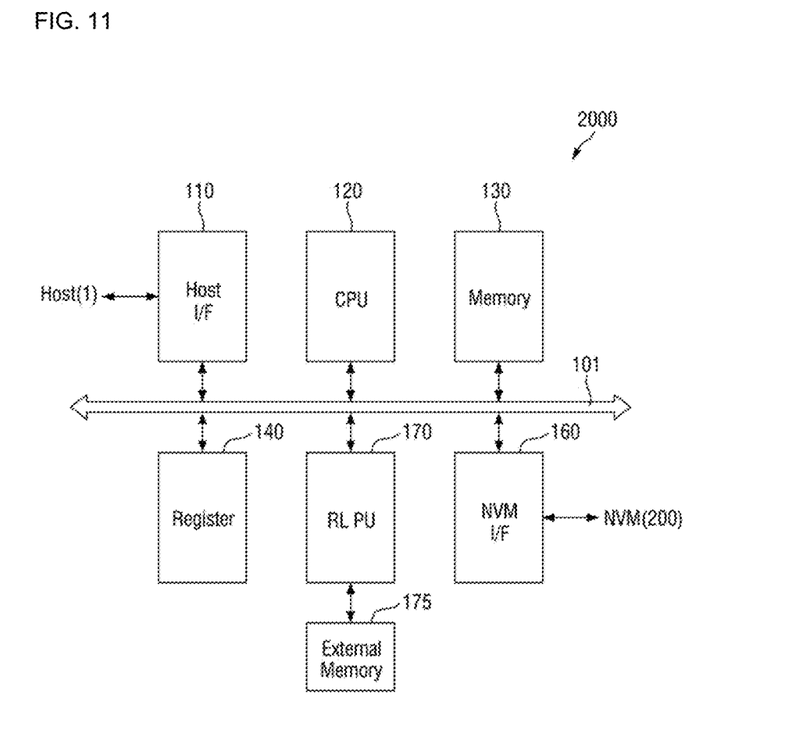
FIG. 11 is a block diagram showing a storage controller according to an exemplary embodiment of the inventive concept.

FIG. 11 is a block diagram showing the storage controller 2000 according to an exemplary embodiment of the inventive concept. For simplicity of description, differences from FIG. 10 will be mainly described.

The storage controller 2000 of FIG. 11 includes the separate learning processing unit 170 shown in FIG. 10. However, unlike FIG. 10, the storage controller 2000 further includes a separate external memory 175 for storing information required for the reinforcement learning.

For example, the external memory 175 may store information related to the queue table and the reward.

Figure 12:
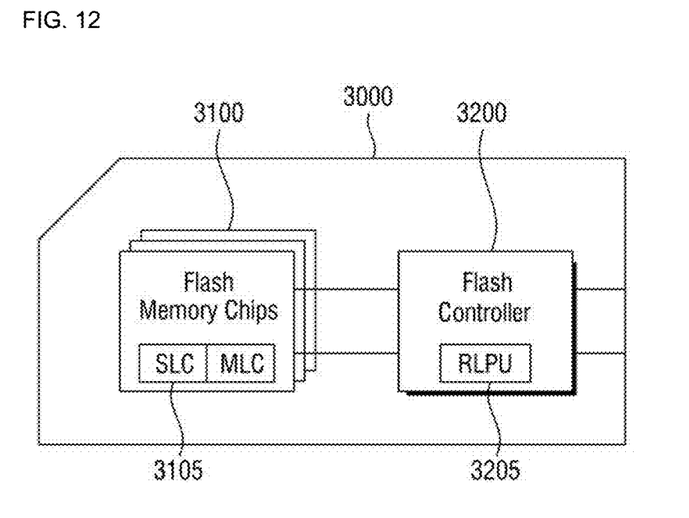
FIG. 12 is a block diagram showing a data storage device according to an exemplary embodiment of the inventive concept.

FIG. 12 is a block diagram showing a data storage device according to an exemplary embodiment of the inventive concept.

Referring to FIG. 12, a data storage device 3000 according to an exemplary embodiment of the present disclosure includes flash memory chips 3100 and a flash controller 3200. The flash controller 3200 may control the flash memory chips 3100 based on control signals received from the outside of the data storage device 3000.

The configuration of the flash memory chips 3100 is substantially the same as one of the nonvolatile memory devices 200 of FIGS. 1, 3, 4, and 5, and is composed of multiple chips. Each of the flash memory chips 3100 of the present embodiment may be formed of any one of a stack flash structure in which arrays are stacked in multiple layers, a flash structure having no source-drain, a pin-type flash structure, and a three-dimensional flash structure.

The data storage device 3000 according to some embodiments may form a memory card device, a solid state drive (SSD) device, a multimedia card device, an SD device, a memory stick device, a hard disk drive device, a hybrid drive device, or a general-purpose serial bus flash device. For example, the data storage device 3000 of the present embodiment may constitute a memory card that meets industry standards for using user devices such as digital cameras, personal computers, and the like.

The flash controller 3200 may program write data to the flash memory chips 3100. In this case, the flash controller 3200 may determine whether the write data is stored in the single-level cell area or the multi-level cell area of the flash memory chips 3100. The flash controller 3200 may perform the same function as the storage controller 100. For example, the flash controller 3200 may determine the ratio between the single-level cell area and the multi-level cell area of the flash memory chips 3100 depending on a prediction result of the reinforcement learning described above. According to an exemplary embodiment, the flash controller 3200 includes a learning processing unit 3205 (e.g., a processor). The learning processing unit 3205 may be the learning processing unit of FIG. 10 or FIG. 11.

Accordingly, the data storage device 3000 according to some embodiments may program the write data into the single-level cell area or the multi-level cell area depending on the prediction result of the reinforcement learning while minimizing the migration cost between the single-level cell area and the multi-level cell area.

Figure 13:
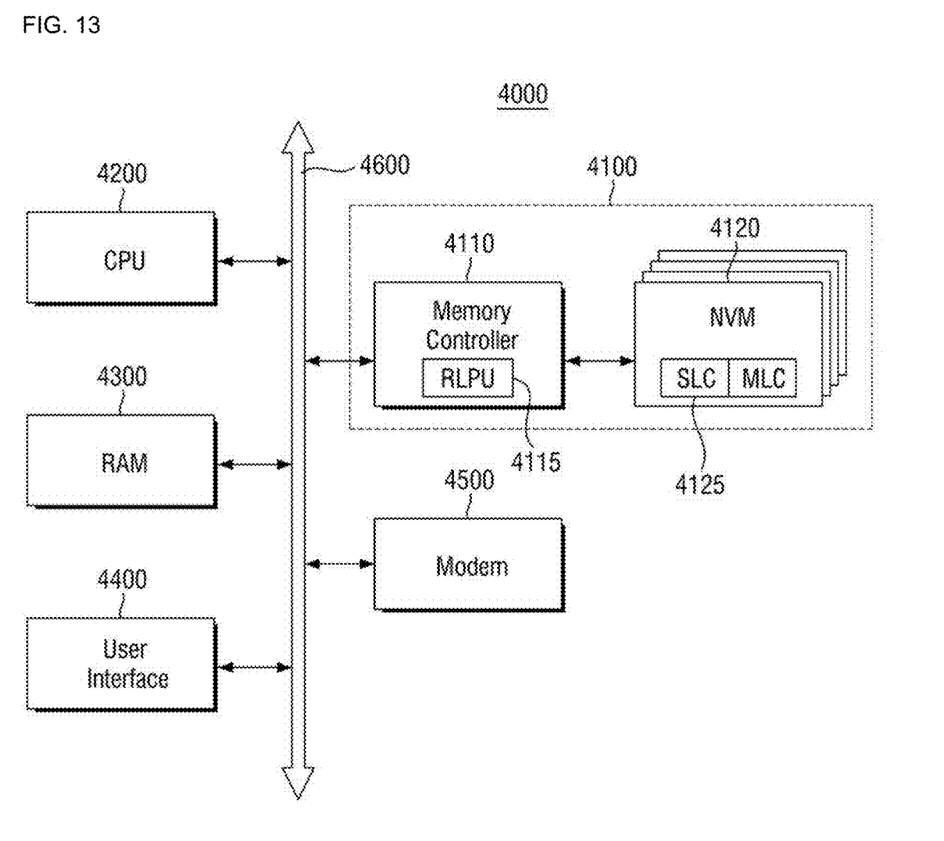
FIG. 13 is a diagram illustrating an example in which a storage device according to an exemplary embodiment is applied to a mobile system.

FIG. 13 is a diagram illustrating an example in which a storage device according to some embodiments is applied to a mobile system.

Referring to FIG. 13, a mobile system 4000 includes a processor 4200, a main memory 4300 (e.g., a RAM), a user interface 4400, a modem 4500 such as a baseband chipset, and a storage device 4100.

The processor 4200 may execute various computing functions, such as executing specific software for performing certain calculations or tasks. For example, the processor 4200 may be a microprocessor or a central processing unit (CPU). The processor 4200 may be connected to the main memory 4300 through a bus 4600 such as an address bus, a control bus, and/or a data bus. For example, the main memory 4300 may be implemented as DRAM, mobile DRAM, SRAM, PRAM, FRAM, RRAM, and/or MRAM. In addition, the processor 4200 may be connected to an expansion bus such as a peripheral component interconnect (PCI) bus. Accordingly, the processor 4200 may control the user interface 4400 including one or more input devices such as a keyboard or a mouse and one or more output devices such as a printer or a display device. The modem 4500 may transmit/receive data wirelessly to/from an external device. In a nonvolatile memory 4120, data processed by the processor 4200, data received through the modem 4500, or the like may be stored through the memory controller 4110. Although not shown, the mobile system 4000 may further include a power supply for supplying an operating voltage. In addition, according to an embodiment, the mobile system 4000 may further include an application chipset, a camera image processor (CIP), and the like.

The memory controller 4110 may perform an access operation on the nonvolatile memory 4120, that is, a data read operation, a data write operation, and/or a data transfer operation.

The memory controller 4110 may include the storage controller 100 described with reference to FIGS. 1 to 11. According to some embodiments, the memory controller 4110 may perform an operation related to the reinforcement learning in the processing unit 120 of FIG. 2. According to some embodiments, the storage controller 100 may perform an operation related to the reinforcement learning in the learning processing unit 4115 that is the same as the learning processing unit 170 of FIG. 10 or FIG. 11.

Through the reinforcement learning, the size of the single-level cell area is dynamically adjusted based on the environmental information of the mobile system 4000 and thus dynamically adapts to the current state of the mobile system 4000. The environmental information includes, for example, pattern information of a read, write or delete command of the mobile system 4000, and internal state information or external information of the storage device 4100.

In some embodiments, the nonvolatile memory 4120 may include a single-level cell area and a multi-level cell area 4125.

The storage device 4100 may be implemented as various types of packages. For example, the storage device 4100 may be mounted using packages such as Package on Package (PoP), Ball Grid Arrays (BGAs), Chip Scale Packages (CSPs), Plastic Leaded Chip Carrier (PLCC), Plastic Dual In-Line Package (PDIP), Die In Waffle Pack (DIWP), Die In Wafer Form (DIWF), Chip On Board (COB), Ceramic Dual In-Line Package (CERDIP), Plastic Metric Quad Flat Pack (MQFP), Thin Quad Flat Pack (TQFP), Small Outline Package (SOP), Shrink Small Outline Package (SSOP), Thin Small Outline Package (TSOP), Thin Quad Flat Pack (TQFP), System In Package (SIP), Multi Chip Package (MCP), Wafer-level Fabricated Package (WFP) and Wafer-Level Processed Stack Package (WSP).

Figure 14:
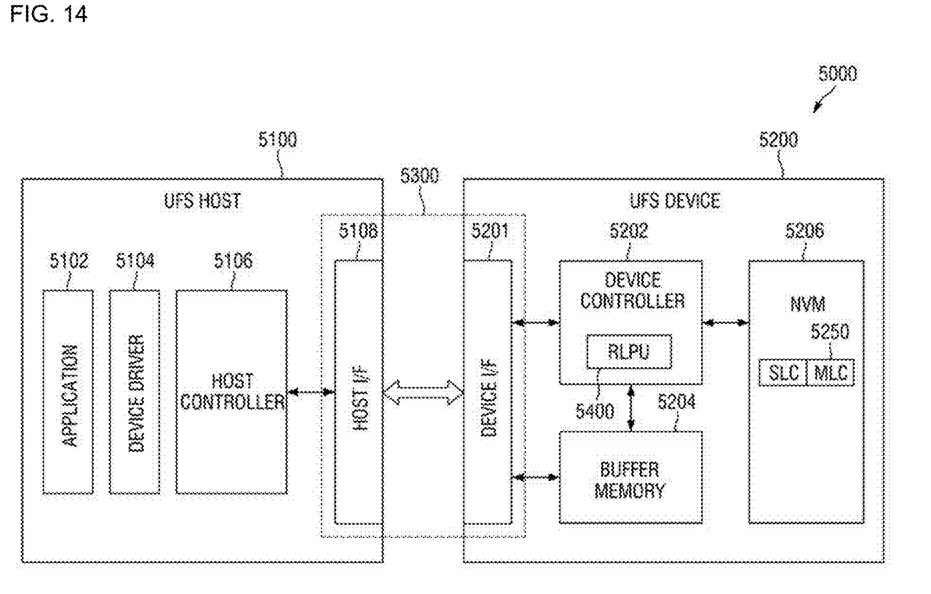
FIG. 14 is a block diagram illustrating a universal flash storage (UFS) system according to an exemplary embodiment of the inventive concept.

FIG. 14 is a block diagram illustrating a UFS system according to an exemplary embodiment of the inventive concept.

Referring to FIG. 14, a UFS (universal flash storage) system 5000 includes a UFS host 5100 and a UFS device 5200. The UFS host 5100 and the UFS device 5200 may be connected to each other through a UFS interface 5300. The UFS system 5000 is based on a flash memory 5206 that is a nonvolatile memory device. The UFS system 5000 may be used in a mobile device such as a smart phone.

The UFS host 5100 includes an application 5102, a device driver 5104, a host controller 5106, and a host interface 5108.

The application 5102 includes various application programs that run on the UFS host 5100. The device driver 5104 is used to drive peripheral devices connected to the UFS host 5100 and may drive the UFS device 5200. The application 5102 and the device driver 5104 may be implemented through software, firmware, or the like.

The host controller 5106 may generate a protocol or a command to be provided to the UFS device 5200 in response to the request of the application 5102 and the device driver 5104. The generated command may be provided to the UFS device 5200 through the host interface 5108. When the host controller 5106 receives a write request from the device driver 5104, the host controller 5106 provides a write command and data to the UFS device 5200 through the host interface 5108. When receiving a read request from the device driver 5104, the host controller 5106 provides a read command to the UFS device 5200 through the host interface 5108 and receives data from the UFS device 5200.

The UFS interface 5300 uses a serial advanced technology attachment (SATA) interface. The SATA interface is largely divided into a physical layer, a link layer, and a transport layer by its function.

The host interface 5108 of the UFS host 5100 includes a transmitter and a receiver, and a device interface 5201 of the UFS device 5200 includes a receiver and a transmitter. The transmitters and receivers belong to the physical layer of the SATA interface. The transmitter of the host interface 5108 of the UFS host 5100 is connected to the receiver of the device interface 5201 of the UFS device 5200, and the transmitter of the device interface 5201 of the UFS device 5200 is connected to the receiver of the host interface 5108 of the UFS host 5100.

The UFS device 5200 may be connected to the UFS host 5100 through the device interface 5201. The host interface 5108 and the device interface 5201 may be connected to each other through a data line for exchanging data or signals and through a power line for providing power.

The UFS device 5200 may include a device controller 5202, a buffer memory 5204, and a nonvolatile memory device 5206. The device controller 5202 may control overall operations such as write, read and erase operations of the nonvolatile memory device 5206. The device controller 5202 may exchange data with the buffer memory 5204 or the nonvolatile memory device 5206 through an address and data bus. The device controller 5202 may include a central processing unit (CPU), a device direct memory access (DMA), a flash DMA, a command manager, a buffer manager, a flash translation layer (FTL), a flash manager, and the like.

The UFS device 5200 provides a command received from the UFS host 5100 to the device DMA and the command manager through the device interface 5201. The command manager may allocate the buffer memory 5204 to receive data through the buffer manager, and when the data transmission preparation is completed, send a response signal to the UFS host 5100.

The UFS host 5100 may transmit data to the UFS device 5200 in response to the response signal. The UFS device 5200 may store the transmitted data in the buffer memory 5204 through the device DMA and the buffer manager. The data stored in the buffer memory 5204 is provided to the flash manager through the flash DMA. Then, the flash manager may store the data at a selected address of the nonvolatile memory device 5206 with reference to address mapping information of the flash translation layer (FTL).

The UFS device 5200 may send a response signal to the UFS host 5100 and notify completion of the command through the device interface 5201 when the data transmission and the program required by the command of the UFS host 5100 are completed. The UFS host 5100 may inform the device driver 5104 and the application 5102 of the completion of the command associated with the received response signal, and terminate the command.

The device controller 5202 in the UFS system 5000 may include the storage controller 100 described with reference to FIGS. 1 to 11. According to some embodiments, the device controller 5202 may perform an operation related to the reinforcement learning in the processing unit 120 of FIG. 2. For example, the device controller 5202 may perform the same function as the storage controller 100. According to some embodiments, the device controller 5202 may perform an operation related to the reinforcement learning in the learning processing unit 5400 that is the same as the learning processing unit 170 of FIG. 10 or FIG. 11.

Through the reinforcement learning, the size of the single-level cell area is adjusted based on the environmental information of the UFS system 5000 and is dynamically adapted to the current state of the UFS system 5000. The environmental information includes, for example, pattern information of a read, write or delete operation of the UFS host 5100, and internal state information or external information of the UFS device 5200.

In some embodiments, the nonvolatile memory device 5206 may include a single-level cell area and a multi-level cell area 5250.

According to some embodiments, the buffer memory 5204 may include the register 140 of FIG. 2. According to some embodiments, the buffer memory 5204 may include the memory 130 of FIG. 2.

Figure 15:
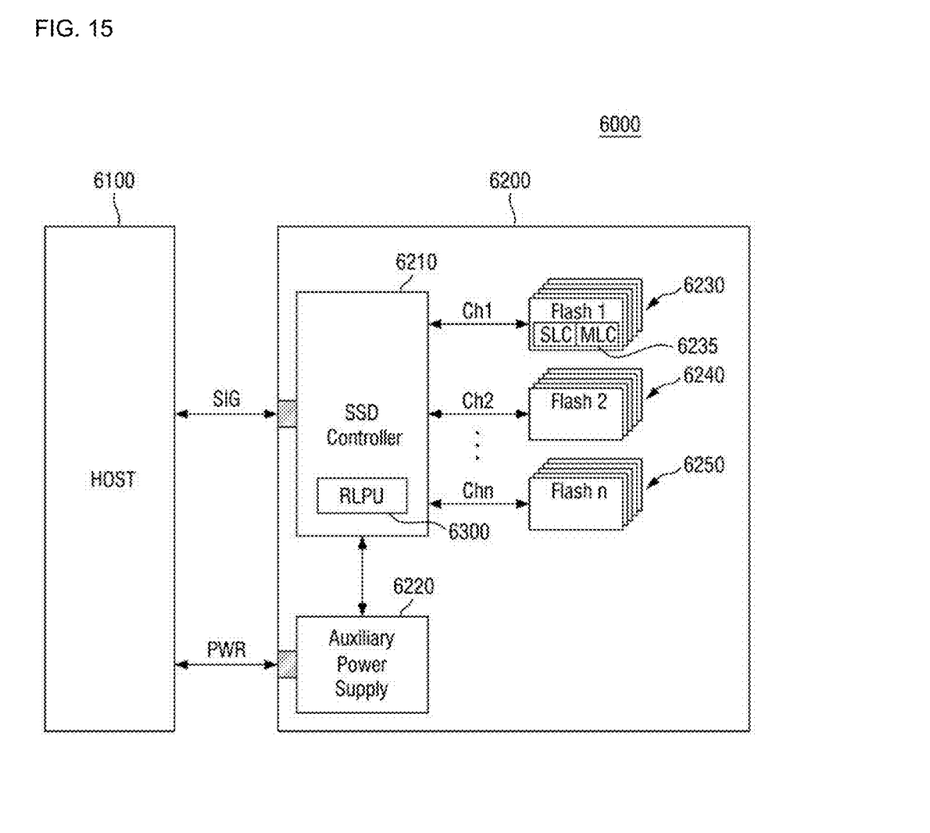
FIG. 15 is a block diagram illustrating a solid state storage device according to an exemplary embodiment of the inventive concept.

FIG. 15 is a block diagram illustrating a solid state storage device (e.g., an SSD) according to an exemplary embodiment of the inventive concept.

Referring to FIG. 15, an SSD system 6000 includes a host 6100 and an SSD 6200. The SSD 6200 exchanges a signal SIG with the host 6100 through a signal connector, and receives a power PWR through a power connector. The SSD 6200 includes an SSD controller 6210, a plurality of flash memories 6230, 6240 and 6250, and an auxiliary power supply 6220.

The SSD controller 6210 may control the plurality of nonvolatile memories 6230, 6240 and 6250 in response to the signal SIG received from the host 6100. As an example, the SSD controller 6210 and the nonvolatile memories 6230, 6240 and 6250 may include the storage controller 100 and the nonvolatile memory 200 described with reference to FIGS. 1 to 12.

At least one of the plurality of nonvolatile memories 6230, 6240 and 6250 may include a single-level cell area and a multi-level cell area 6235.

According to an exemplary embodiment, the SSD controller 6210 includes a learning processing unit 6300. The learning processing unit 6300 may perform the reinforcement learning on the size of the single-level cell area based on the environmental information of the SSD system 6000. In an exemplary embodiment, the learning processing unit 6300 performs the reinforcement learning whenever the size of the write data received from the host 6100 is equal to or larger than the single-level cell area.

According to some embodiments, the SSD controller 6210 may perform the reinforcement learning in the processing unit 120 shown in FIG. 2 instead of a separate learning processing unit.

The auxiliary power supply 6220 is connected to the host 6100 through the power connector. The auxiliary power supply 6220 may receive the power PWR from the host 6100 and be charged. The auxiliary power supply 6220 may provide power to the SSD system 6000 when the power supply from the host 6100 is not smooth or cuts off. As an example, the auxiliary power supply 6220 may be located inside the SSD 6200, or may be located outside the SSD 6200. For example, the auxiliary power supply 6220 may be located on a main board of the SSD system 6000 and provide auxiliary power to the SSD 6200.

The SSD 6200 may perform an access operation on the flash memories 6230, 6240 and 6250 by using a charged power of the auxiliary power supply 6220 during a sudden power off.

As discussed above, at least one exemplary embodiment of the inventive concept dynamically adjusts relative sizes of SLC area (e.g., a cache) and an MLC area of a memory device of a memory system using a reinforce learning operation that considers environmental factors of the system.

In concluding the detailed description, those skilled in the art will appreciate that many variations and modifications may be made to these exemplary embodiments without substantially departing from the principles of the present inventive concept.

What is claimed is:

1. A storage device comprising:
    at least one nonvolatile memory including a single-level cell area and a multi-level cell area; and
    a storage controller configured to dynamically resize the single-level cell area through reinforcement learning,
    wherein the reinforcement learning determines a selected state among a plurality of states using environmental information of the storage device, calculates a current reward from the selected state and the environmental information, determines a reward direction based on the current reward and reward history associated with the selected state, and adjusts a size of the single-level cell area according to the determined reward direction.

2. The storage device of claim 1, wherein the storage controller performs the reinforcement learning whenever a total amount of write data received from a host reaches a threshold sector count value.

3. The storage device of claim 2, wherein the storage controller includes a queue table comprising a plurality of entries, where each entry indicates one of the plurality of states and the reward history, and
    wherein the storage controller adjusts the threshold sector count value according to the calculated reward direction.

4. An operating method of a storage device, the method comprising:
    dividing a nonvolatile memory into a single-level cell area and a multi-level cell area;
    performing reinforcement learning by determining a selected state among a plurality of states using environmental information of the storage device, calculating a current reward from the selected state and the environmental information, and determining a reward direction based on the current reward and reward history associated with the selected state; and
    dynamically adjusting a size of the single-level cell area according to the determined reward direction.

5. The method of claim 4, further comprising:
    adjusting a threshold sector count value according to the determined reward direction; and
    adjusting the size of the single-level cell area according to the adjusted the threshold sector count value.

6. The method of claim 5, wherein the performing of the reinforcement learning comprises:
    collecting the environmental information from the nonvolatile memory and the host during a current cycle.

7. The method of claim 6, wherein the environmental information includes space utilization information, valid page count information, invalid page count information, and valid/invalid page count ratio information about the nonvolatile memory in the current cycle.

8. The method of claim 6, wherein the environmental information includes an average write sector count value for the host.

9. The method of claim 6, wherein the environmental information includes historical information about an adjustment to the size of the single-level cell area in a previous cycle.

10. A storage device comprising:
    a nonvolatile memory including a single-level cell area and a multi-level cell area; and
    a storage controller comprising a processing unit configured to perform reinforcement learning on environmental information of the storage device to determine a reward from a migration cost in a current cycle and a valid/invalid page count ratio in the current cycle, and determine an optimal ratio of the single-level cell area to the multi-level area from the determined reward, and wherein the storage controller dynamically adjusts a size of the single-level cell area according to the determined optimal ratio.

11. The storage device of claim 10, wherein the processing unit performs the reinforcement learning when write data of a host to be written to the single-level cell area is predicted to completely fill the single-level cell area.

12. The storage device of claim 11, wherein the processing unit resizes the single-level cell area in a current state and collects the environmental information of the storage device during the current cycle.

13. The storage device of claim 12, wherein the storage controller includes a register configured to store the size of the single-level cell area in the current state and the environmental information.

14. The storage device of claim 12, wherein the processing unit determines the current state of the nonvolatile memory based on the environmental information.

15. The storage device of claim 14, wherein the processing unit determines the reward from the determined current state and the environmental information.

16. The storage device of claim 15, wherein the storage controller includes a memory storing a queue table which stores a plurality of states respectively mapped to a plurality of pieces of the environmental information, and reward history corresponding to each of the plurality of states.

17. The storage device of claim 10, wherein when a migration cost of a previous cycle is greater than or equal to an average migration cost, the reward is determined as a negative reward for resizing the single-level cell area when a valid/invalid page count ratio of the single-level cell area in the current cycle is smaller than a valid/invalid page count ratio of the single-level cell area in the previous cycle, and the reward is determined as a positive reward when the valid/invalid page count ratio of the single-level cell area in the current cycle is not smaller than the valid/invalid page count ratio of the single-level cell area in the previous cycle.

18. The storage device of claim 10, wherein when a migration cost of a previous cycle is smaller than an average migration cost, the reward is determined as a negative reward for resizing the single-level cell area.

19. The storage device of claim 18, wherein when the migration cost of the previous cycle is smaller than the average migration cost, the negative reward for resizing the single-level cell area is increased when a valid/invalid page count ratio of the multi-level cell area in the current cycle is smaller than a valid/invalid page count ratio of the multi-level cell area in the previous cycle.

* * * * *